United States Patent
Ko (10) Patent No.: US 11,172,028 B2
(45) Date of Patent: Nov. 9, 2021

(54) METHOD AND SERVER DEVICE FOR PROVIDING INTERNET OF THINGS PLATFORM SERVICE

(71) Applicant: SK TELECOM CO., LTD., Seoul (KR)

(72) Inventor: Karam Ko, Seoul (KR)

(73) Assignee: SK TELECOM CO., LTD., Seoul (KR)

( * ) Notice: Subject to any disclaimer, the term of this patent is extended or adjusted under 35 U.S.C. 154(b) by 0 days.

(21) Appl. No.: 16/652,640

(22) PCT Filed: Sep. 12, 2018

(86) PCT No.: PCT/KR2018/010696
§ 371 (c)(1),
(2) Date: Mar. 31, 2020

(87) PCT Pub. No.: WO2019/078489
PCT Pub. Date: Apr. 25, 2019

(65) Prior Publication Data
US 2020/0244740 A1    Jul. 30, 2020

(30) Foreign Application Priority Data

Oct. 19, 2017    (KR) .................. 10-2017-0135919
Oct. 27, 2017    (KR) .................. 10-2017-0141491

(51) Int. Cl.
*G06F 15/16*    (2006.01)
*H04L 29/08*    (2006.01)

(52) U.S. Cl.
CPC ........ *H04L 67/125* (2013.01); *H04L 67/2861* (2013.01)

(58) Field of Classification Search
CPC .............. H04L 67/125; H04L 67/2861; H04L 67/1095
(Continued)

(56) References Cited

U.S. PATENT DOCUMENTS 7,768,515 B1 *   8/2010   Eitzmann .................. G06T 1/20
                                                          345/501
7,898,546 B1 *   3/2011   Eitzmann .................. G06T 1/60
                                                          345/522
(Continued)

FOREIGN PATENT DOCUMENTS

KR    10-2002-0003696    1/2002
KR    2003-0063531 A    7/2003
(Continued)

OTHER PUBLICATIONS

Korean Intellectual Property Office, Notification of Reason for Refusal, Korean Patent Application No. 10-2017-0141491, dated Jun. 25, 2020, five pages.
(Continued)

*Primary Examiner* — Liang Che A Wang
(74) *Attorney, Agent, or Firm* — Fenwick & West LLP (57) ABSTRACT

A method and a server device for providing an IoT platform service are provided. According to at least one aspect of the present disclosure, a method of providing an IoT platform service, which is performed by an IoT platform server apparatus, generates a shadow device corresponding to an IoT device, manages state information of the IoT device through the corresponding shadow device, and registers and administers a specification (i.e., a device descriptor) regarding common features of a plurality of devices.

8 Claims, 7 Drawing Sheets

IoT Service User

IoT Service Developer (58) Field of Classification Search
USPC .......................................... 709/201, 223, 224
See application file for complete search history.

(56) References Cited

U.S. PATENT DOCUMENTS

| | | | |
|---|---|---|---|
| 2002/0124236 A1* | 9/2002 | Ruths | G06F 9/465 |
| | | | 717/104 |
| 2013/0073663 A1 | 3/2013 | Eldering | |
| 2016/0087933 A1 | 3/2016 | Johnson et al. | |
| 2017/0006006 A1* | 1/2017 | Rawcliffe | H04L 63/08 |
| 2017/0093593 A1 | 3/2017 | Yang et al. | |
| 2017/0123721 A1* | 5/2017 | Sela | G06F 3/0611 |
| 2017/0221011 A1 | 8/2017 | Von Sichart et al. | |
| 2018/0269921 A1* | 9/2018 | Pawliuk | H04W 56/002 |

FOREIGN PATENT DOCUMENTS

| | | |
|---|---|---|
| KR | 10-2009-0008978 A | 1/2009 |
| KR | 10-2013-0135009 A | 12/2013 |
| KR | 10-2015-0168686 | 11/2015 |
| KR | 10-2017-0062910 A | 6/2017 |
| WO | WO 2009/011555 A2 | 1/2009 |

OTHER PUBLICATIONS

PCT International Search Report and Written Opinion, PCT/KR2018/010696, dated Jan. 3, 2019, 13 pages.
Reinfurt, Lukas et al., Internet of Things Patterns for Devices. PATTERNS 2017: The Ninth International Conferences on Pervasive Patterns and Applications, Athens, Greece, Feb. 19-23, 2017, pp. 117-126.

\* cited by examiner

METHOD AND SERVER DEVICE FOR PROVIDING INTERNET OF THINGS PLATFORM SERVICE

TECHNICAL FIELD

The present disclosure in some embodiments relates to a method and a server device for providing an Internet of Things platform service.

BACKGROUND

The statements in this section merely provide background information related to the present disclosure and do not necessarily constitute prior art.

The IoT platform service is a service that provides common functions necessary for the development or operation of Internet of Things (IoT) services. By utilizing the functions provided by the platform, IoT service developers can develop and operate their services more quickly and easily. In addition, IoT service users can manage the connection of things and monitor the status on the platform, enabling stable service utilization. The IoT platform focuses on managing connections between IoT devices and application servers and stably transmitting data between IoT devices and application servers to achieve stable IoT service operations.

In the conventionally developed IoT platform, since only the current state of the IoT device is provided in synchronization and only simple rule processing using the current state is performed, there is a limit in developing a service using the IoT device on the platform. In order to provide a complex and practical service involving data of multiple devices or past data, the application server needs to store and process data, which requires an additional development process.

DISCLOSURE

Technical Problem

The present disclosure in some embodiments seeks to provide an IoT platform service method and apparatus capable of providing various data processing functions by managing data of IoT devices in a platform.

Another embodiment of the present disclosure is to provide an IoT platform service method and apparatus that can provide various convenience functions and data processing functions by defining and managing data of IoT devices by using a device descriptor.

SUMMARY

At least one aspect of the present disclosure provides a method of providing an Internet of Things (IoT) platform service, the method including generating a shadow device corresponding to each of one or more IoT devices, receiving state information of the IoT device and storing the state information in the shadow device every time the state information is updated, and performing a predetermined operation based on stored state information in the shadow device.

Another aspect of the present disclosure provides an IoT platform service server apparatus including a communication unit, a shadow device manager, and a rule engine. The communication unit is configured to communicate with one or more IoT devices. The shadow device manager is configured to perform a control for generating a shadow device corresponding to each IoT device, and for receiving state information of the IoT device and storing the state information in the shadow device every time the state information is updated. The rule engine is configured to determine whether a predetermined rule condition is satisfied by using stored state information in the shadow device.

Yet another aspect of the present disclosure provides a method of providing an Internet of Things (IoT) platform service, the method including registering a specification (hereinafter, referred to as a 'device descriptor') for common features of a plurality of devices, receiving a connection request from one or more IoT devices, generating a shadow device corresponding to each IoT device, receiving data from the IoT device, and updating a state of the shadow device based on data received from the IoT device.

Yet another aspect of the present disclosure provides an IoT platform service server apparatus including a registration unit, a communication unit, and a virtualization unit. The registration unit is configured to register a specification (hereinafter, referred to as a 'device descriptor') for common features of a plurality of devices. The communication unit is configured to communicate with one or more IoT devices. The virtualization unit is configured to generate, on a server of the IoT platform service server apparatus, a shadow device corresponding to each IoT device, and to update a state of the shadow device based on data received from the IoT device.

Advantageous Effects

As described above, according to some embodiments of the present disclosure, data of IoT devices may be managed and processed within the IoT platform, thereby providing various IoT services.

In addition, according to some embodiments of the present disclosure, various rules can be defined and provided to be executable within the IoT platform, whereby providing real-time data processing easily and quickly without involving an application server.

In addition, according to embodiments of the present disclosure, even if an IoT device is temporarily disconnected from the Internet, one can still retrieve the state information of the IoT device, store a command to be transmitted to the IoT device, and deliver the same command to the IoT device once the connection is resumed, whereby providing stable operation of the IoT service.

In addition, according to embodiments of the present disclosure, the device descriptor of the IoT platform may be used to determine the semantics of data received from the IoT device, thereby facilitating connection to various rules.

In addition, according to embodiments of the present disclosure, the device descriptor of the IoT platform may be used to determine the semantics of the data received from the IoT device, thereby facilitating linkage with an external analysis service.

In addition, according to embodiments of the present disclosure, the device descriptor of the IoT platform may be used to easily determine whether there is a miss of data received from the IoT device.

In addition, according to embodiments of the present disclosure, the device descriptor of the IoT platform may be used to easily determine whether there is an error in the data received from the IoT device.

In addition, according to embodiments of the present disclosure, the device descriptor of the IoT platform may be used to collective manage the data received from IoT devices, thereby reducing development time when developing the IoT service for devices having a common property or feature.

DETAILED DESCRIPTION

Hereinafter, some embodiments of the present disclosure will be described in detail with reference to the accompanying drawings. In the following description, like reference numerals designate like elements, although the elements are shown in different drawings. Further, in the following description of some embodiments, a detailed description of known functions and configurations incorporated therein will be omitted for the purpose of clarity and for brevity.

Additionally, various terms such as first, second, A, B, (a), (b), etc., are used solely for the purpose of differentiating one component from the other, not to imply or suggest the substances, the order or sequence of the components. Throughout this specification, when a part "includes" or "comprises" a component, the part is meant to further include other components, not to exclude thereof unless specifically stated to the contrary. The terms such as "unit," "module," and the like refer to one or more units for processing at least one function or operation, which may be implemented by hardware, software, or a combination thereof.

The detailed description, which will be given below with reference to the accompanying drawings, is intended to explain exemplary embodiments of the present disclosure and is not intended to represent the only embodiments in which the present disclosure may be practiced.

Figure 1:
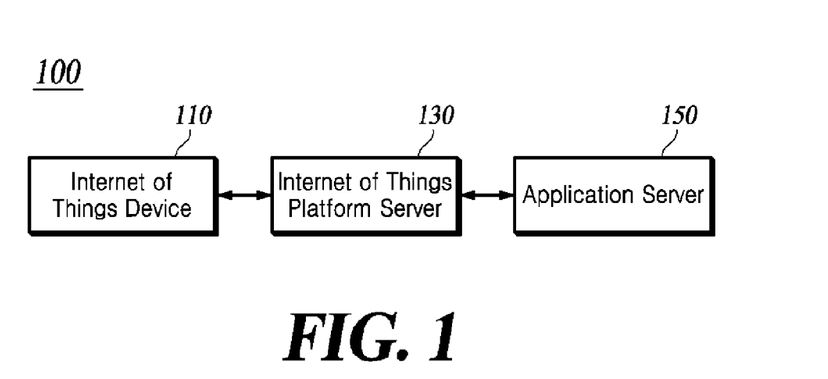
FIG. 1 is a schematic block diagram of a structure of an IoT platform system according to some embodiments of the present disclosure.

FIG. 1 is a schematic block diagram of a structure of an IoT platform system according to some embodiments of the present disclosure.

As shown in FIG. 1, an IoT platform system 100 according to some embodiments includes at least one IoT device 110, an IoT platform server 130, and an application server 150 that interwork with each other through a communication network.

In this case, the connection of the IoT device 110 to a communication network includes a case of the IoT device 110 connecting to a wireless access device (not shown) using short-range wireless communication technology and being connected to a communication network. The short-range wireless communication technology may include a communication technology such as Wi-Fi, Zigbee, Bluetooth, and NFC (Near Field Communication) schemes. The wireless access device is adapted to search for the IoT devices 110 present in the communication coverage according to the corresponding short-range wireless communication standard, establish a connection with the discovered IoT devices 110, and then perform a connection setup and data transmission and reception with the IoT platform server 130.

In some embodiments, the communication network through which the respective components of the IoT platform system 100 interwork with each other collectively refers to various types of established communication networks, for example, closed networks including a local area network (LAN), a wide area network (WAN), or the like, open networks such as the Internet, as well as mobile communication networks including Code Division Multiple Access (CDMA), Wideband Code Division Multiple Access (WCDMA), Global System for Mobile Communications (GSM), Long Term Evolution (LTE), etc., and Wi-Fi networks not to mention other currently available or coming next-generation network and computing network implementations.

The IoT device 110 is a device having a sensor function and a communication function and connected to a communication network to transmit and receive data. The IoT device 110 may be implemented as various embedded systems such as home appliances, mobile equipment, and wearable computers. The IoT device 110 connects to the IoT platform server 130 through a communication network and transmits data such as status information or sensing information to the IoT platform server 130 to perform a predetermined function at the control command from the IoT platform server 130. In this case, the IoT device 110 may access a wireless access device (not shown) that performs short-range wireless communication to establish a connection and then access the IoT platform server 130 through the wireless access device.

The IoT platform server 130 is a platform apparatus for providing an IoT-based service. The IoT platform server 130 provides functions to register and authenticate the IoT device 110, collect and manage data of the IoT device 110, and control the IoT device 110 among other functions. Developers of IoT services may utilize such functions provided by the IoT platform server 130 to develop various IoT-based services. In addition, by way of the IoT platform server 130, the user may manage and monitor the connection and operation control of the IoT device 110 for the Internet of Things services.

The application server 150 is connected to the IoT platform server 130 and serves to manage and control a unique service for each application program by using various types of information of the IoT device 110 transmitted via the IoT platform server 130. There may be multiples of the application server 150, and they may provide, through respective servers, various application services for a smart home, a smart car, and other smart services. In particular, the application server 150 of the present disclosure collects various pieces of information of the IoT device 110 through the IoT platform server 130 and transmits corresponding control information to the IoT device 110 through the IoT platform server 130.

Figure 2:
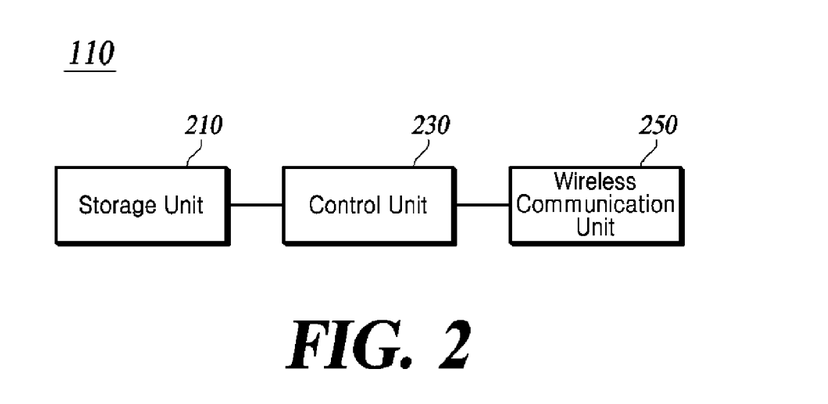
FIG. 2 is a block diagram of a configuration of an IoT device according to at least one aspect of the present disclosure.

FIG. 2 is a block diagram of a configuration of an IoT device according to at least one aspect of the present disclosure.

As shown in FIG. 2, the IoT device 110 may include a storage unit 210, a control unit 230, and a wireless communication unit 250. The components shown in FIG. 2 may be implemented respectively as hardware chips, or they may be implemented in software so that a microprocessor executes a software function corresponding to each component.

The storage unit 210 stores programs and data necessary for the operation of the IoT device 110. The storage unit 210 may store data such as sensing information or state information collected by the IoT device 110 at predetermined intervals. In addition, the storage unit 210 may store a program for performing processing in the IoT device 110, such as the collection and transmission of sensing information or state information.

The control unit 230 is a means for controlling the IoT device 110. The control unit 230 includes a processor for executing a computer program designed to implement the features according to some embodiments of the present disclosure and thereby processes the collection and transmission of the sensing information and the state information through interworking with the IoT platform server 130 and the execution of the remote control command.

The wireless communication unit 250 is configured to transmit and receive data through a communication network, and it may transmit and receive data through various communication schemes as well as a wired method and a wireless method. The wireless communication unit 250 may establish a communication session with the IoT platform server 130 through a communication network, whereby transmitting and receiving data necessary for the IoT service.

In at least one embodiment of the present disclosure, in order for the IoT device 110 to be connected to a communication network, the wireless communication unit 250 may be connected to a wireless access device in a short-range wireless communication method to transmit and receive data. For example, once the wireless communication unit 250 is connected to a wireless access device after going through discovery, authentication, and combining process according to short-range wireless communication standards such as Wi-Fi, Zigbee, and Bluetooth, it may transmit and receive data to and from the wireless access device.

Figure 3:
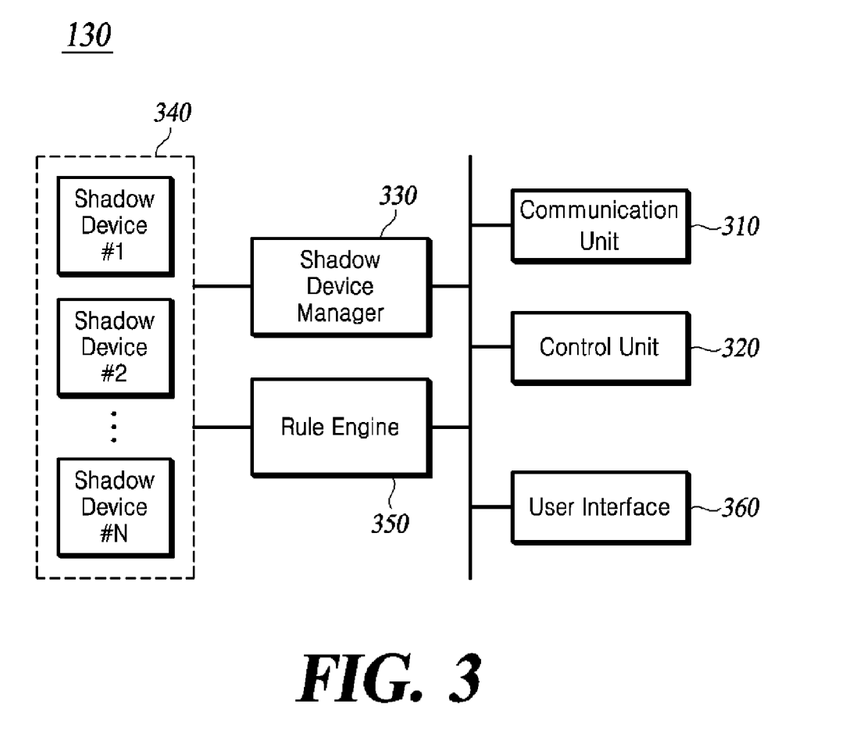
FIG. 3 is a block diagram of a configuration of an IoT platform server according to at least one aspect of the present disclosure.

FIG. 3 is a block diagram of a configuration of an IoT platform server according to at least one aspect of the present disclosure.

As shown in FIG. 3, the IoT platform server 130 may include a communication unit 310, a control unit 320, a shadow device manager 330, shadow devices 340, a rule engine 350, and a user interface 360. The components as shown in FIG. 3 may be implemented respectively as hardware chips, or they may be implemented in software so that a microprocessor executes a software function corresponding to each component.

The communication unit 310 is configured to transmit and receive data through a communication network and may transmit and receive data through various communication methods as well as wired and wireless methods. The communication unit 310 may establish a communication session with the IoT device 110 or the application server 150, which accesses through a communication network, whereby transmitting/receiving data to/from the IoT device 110 or the user application server 150.

The control unit 320 is a configuration for controlling overall IoT platform services, which may register a plurality of IoT devices 110 according to a service algorithm, and may manage and process data transmitted from the registered IoT devices 110. In addition, at a request of the application server 150, the control unit 320 searches and provides data, or it controls the shadow device manager 330 to transmit/receive data so that the received command can be transmitted to the relevant IoT device 110. For the purpose of security, the control unit 320 checks the authority of the IoT device 110 and the application server 150 for the authentication and request, and according to the confirmed authority, the control unit 320 processes requests or data sent from the IoT device 110 and the application server 150.

The shadow device manager 330 may manage matching information between the IoT device 110 and one or more shadow devices 340, and it may store and manage data for the shadow devices 340 respectively corresponding to the IoT devices 110. At a connection request of the IoT device 110 made to the IoT platform server 130, the shadow device manager 330 generates a corresponding shadow device 340. The shadow device manager 330 stores the data transmitted from the IoT device 110 in the corresponding shadow device 340, and retrieves and provides the data according to a request of the application server 150. In addition, when there is a control command for the IoT device 110 through the application server 150, the shadow device manager 330 stores the control command information in the shadow device 340 and renders the control command information stored in the shadow device 340 to be transmitted to the IoT device 110.

In preparation for storing data in the shadow device 340, the shadow device manager 330 may first process data previously stored in the shadow device 340 and data to be newly stored (history data) therein according to a rule defined in the rule engine 350. The shadow device manager 330 may reduce or abbreviate and store data through a data aggregation process for history data according to a rule designated by a user. For example, the shadow device manager 330 may aggregate the state information for a predetermined time to store, in the shadow device 340, statistical values such as a maximum value, a minimum value, an average value, a count value, a variance, an average value for each time zone, and a representative value for a data group. Taking account of a large amount of storage space to store the history data in its unabridged raw data form in the shadow device 340 and a high processing cost for data transfer, the shadow device manager 330 may process the data through the rule engine 350 and then store the processed data in the shadow device 340.

The shadow device 340 is a logical entity on a server, which is mapped one-to-one with a physical device or a virtual device and exists in a one-to-one correspondence with the registered IoT device 110. In this case, the IoT device 110 may include not only a physical device but also a virtual device, and thus, the shadow device 340 may exist alone without the physical device on the platform. The shadow device 340 is always present in synchronization with the current state of the IoT device 110, and it may store history-based information as well as current state information of the IoT device 110. The shadow device 340 may receive and store state information of the IoT device 110. Furthermore, each time the state information is updated, the shadow device 340 may accumulate and store updated state information while maintaining previously stored information.

In addition, the shadow device 340 stores information on a control command transmitted to the IoT device 110. The IoT platform server 130 may transmit a control command to the IoT device 110 at a request from the application server 150 or when a rule condition defined in the rule engine 350 is satisfied. In this case, the shadow device 340 stores control command information transmitted to the IoT device 110 and a result of the control command performed by the IoT device 110. The shadow device 340 may likewise store the control command information and the control result when there is a control request from the application server 150 over the IoT device 110.

In other words, the shadow device 340 is a logical IoT device corresponding to the IoT device 110 implemented in the IoT platform server 130. The shadow device 340 is configured to store the current state information and the past state information of the IoT device 110 and all control commands received or performed by the IoT device 110. A developer developing an IoT service through an IoT platform or a user using the IoT service is supposed to monitor and control the IoT service through the IoT device 110 or the application server 150. At this time, the IoT platform server 130 does not merely work to transfer data between the IoT device 110 and the application server 150, but also stores and manages the state information and the control information of the real IoT device 110 in its matching shadow device 340.

In addition, even when the IoT device 110 is temporarily disconnected from the Internet, the shadow device 340 stores the state information of the IoT device 110, and it is capable of providing data when requested by the application server 150 and keeping the data when there is a control command of the IoT device 110 until the latter is reconnected to the Internet when the shadow device 340 can provide the data to the IoT device 110. This enables reliable operation of the IoT service even with unstable Internet connections.

The rule engine 350 provides a function of automatically processing data according to a predefined rule. The rule engine 350 provides a function of setting various rules based on data stored in the shadow device 340 and may perform various operations by itself without special input, according to a rule set by a user.

For example, when data below a specific value repeats itself for a certain period of time, the rule engine 350 may have an operation automatically performed as is set in the rule. Such operation may include providing an alarm to the user or giving control commands to restart the device.

In some embodiments, the rule engine 350 may use history data as well as the current state data of the IoT device 110, whereby allowing to set rules by using various data and enabling the IoT platform server 130 to autonomously provide extensive data processing in real-time.

For example, the rule engine 350 may use history data of the IoT device 110 for setting a rule to give an alarm in response to incoming data that deviates from the average value for the last hour, or for setting a rule to issue a specific control command for incoming data that falls outside 10% of the maximum value during the past day in relation to the IoT device 110 in a group of organized IoT devices 110.

The conventional IoT platform system has the IoT platform server obtain and store just the current state information of the IoT device, allowing the built-in rule engine to at best perform simple data processing using the current state information. In order to provide complex and diverse services, it has been common to implement dedicated functions of storing and processing data to the respective complex and diverse services in an application server. With the IoT platform system according to some embodiments of the present disclosure, the history data of the IoT device can be used for setting rules in the rule engine, whereby allowing the IoT platform server to autonomously perform various types of data processing saving the need for implementing those dedicated functions in an application server.

The user interface unit 360 provides a user or a developer with an interface for inputting or selecting basic information and protocol information of an IoT service. The user interface 360 provides a user interface (UI) screen through which a user or developer can define a communication server or protocol. Such a user interface screen may be used by a general non-programmer user through a checkbox and a checklist to drive a communication server module and generate an interface between an IoT terminal and a server. At this time, the UI screen is configured to allow the user to make all settings for the server and protocol with a simple click.

Figure 4:
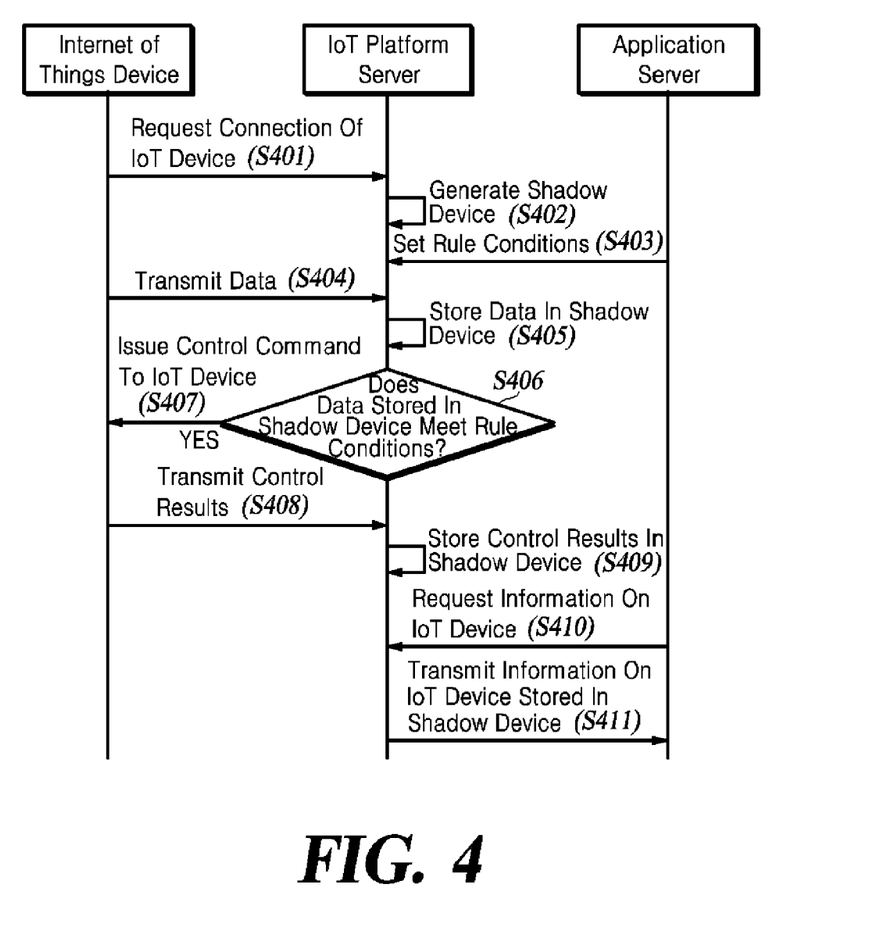
FIG. 4 is a flowchart illustrating a rule engine based IoT device control method in an IoT platform system according to at least one aspect of the present disclosure.

FIG. 4 is a flowchart illustrating a rule engine based IoT device control method in an IoT platform system according to at least one aspect of the present disclosure.

As shown in FIG. 4, when there is a connection request of the IoT device (S401), the IoT platform server generates a corresponding shadow device (S402). In this case, the IoT device may include a virtual device as well as a physical device. A shadow device is a logical entity existing on a server by mapping one-to-one with a physical device or a virtual device, and it exists in a one-to-one correspondence with an IoT device. In some embodiments of the present disclosure, the shadow device receives and stores state information of the IoT device, and preferably accumulates and stores the updated state information while maintaining the pre-stored information whenever the state information is updated. The process of generating the shadow device in Step S402 is performed only once at the first access request of the IoT device.

The developer or user of the IoT service sets rules conditions for operating the service through the application server (S403). The rule engine is a configuration that provides a function for automatically processing data under these predefined rule conditions. The rule engine of the IoT platform server may determine whether the rule condition is satisfied by using state information stored in the shadow device.

For example, the rule engine may use the history data of the IoT devices for setting a rule to alarm in response to incoming data that is out of the average value for the last hour, or for setting a rule to issue a specific control command for incoming data that falls outside 10% of the maximum value during the past day in relation to the IoT device in a group of organized IoT devices.

Since the rule engine can use the history data of the IoT device, rules can be set by using various data. Through this rule engine, a developer can provide various services without processing data through an application server.

When data is transmitted from the IoT device (S404) and received by the IoT platform server, the latter stores the received data on the shadow device (S405). In Step S405, the pre-stored data and new data to store may be processed and stored according to a rule defined in the rule engine. The data may be reduced or abbreviated and stored through data aggregation processing of history data according to a user-specified rule. For example, the state information for a predetermined time may be aggregated to store, in the shadow device, statistical values such as a maximum value, a minimum value, an average value, a count value, a variance, an average value for each time zone, and a representative value for a data group. Taking account of a large amount of storage space to store the history data in its unabridged raw data form in the shadow device and a high processing cost for data transfer, the shadow device manager may process the data through the rule engine and store the processed data in the shadow device.

The rule engine in the IoT platform server determines whether data stored in the shadow device meets predetermined rule conditions (S406), and if yes, it performs a predetermined operation such as issuing a control command to the IoT device (S407). The IoT device follows the control command, and when it transmits the control results to the IoT platform server (S408), the IoT platform server stores the control results in the shadow device (S409).

The shadow device is configured to store current state information, past state information, and control commands of the IoT device, and Steps S405 and S409 are performed repeatedly whenever there is data transmission from the IoT device or control command to the IoT device. Through these steps, the IoT device and its shadow device may always exist in synchronization, and the shadow device may store history data and information on control commands generated so far.

When there is a request for information on IoT devices from the application server (S410), the IoT platform server transmits the IoT device-related information stored in the shadow device to the application server (S411). The IoT platform server transmits the information stored in the shadow device without having to receive or request the current state information of the IoT device.

In the existing IoT platform system, the embedded rule engine could only perform simple data processing using the current state information, and it was common to implement this in an application server in order to provide complex and various services. With the IoT platform system according to the present embodiments, the shadow device on the platform stores the history data of the IoT device until it can be used, allowing the history data to be available for rule setting in the rule engine and thereby enabling the IoT platform server to autonomously process various types of data without going through an application server.

Figure 5:
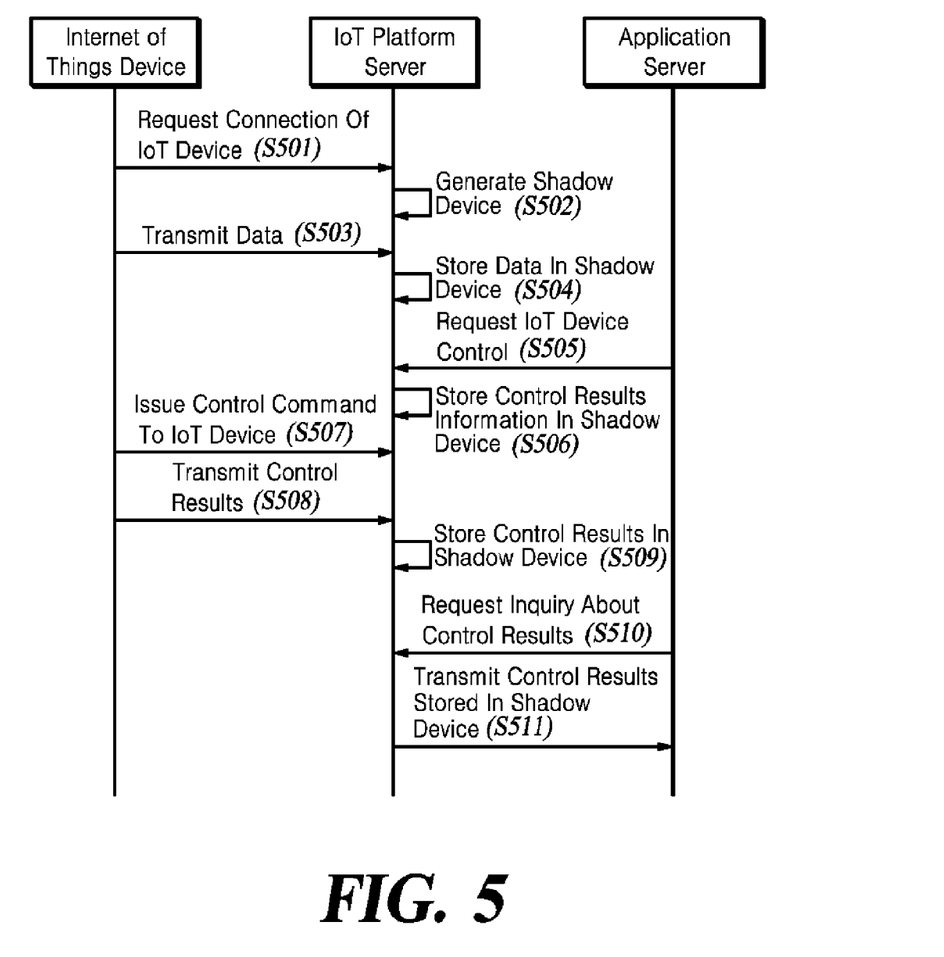
FIG. 5 is a flowchart illustrating a method of controlling an IoT device by an application server in an IoT platform system according to at least one aspect of the present disclosure.

FIG. 5 is a flowchart illustrating a method of controlling an IoT device by an application server in an IoT platform system according to at least one aspect of the present disclosure.

In the following, a repetitive description of FIG. 4 will be omitted to avoid redundancy.

As shown in FIG. 5, when there is a connection request of the IoT device (S501), the IoT service server generates a corresponding shadow device (S502). The generation of the shadow device in Step S502 is performed only once at the first request for the connection of the IoT device. When data is transmitted from the IoT device (S503) and received by the IoT platform server, the platform server stores its received data in the shadow device (S504). The shadow device may exist in synchronization with the IoT device at all times through Step S503 and Step S504 and may store history data.

The application server requests the IoT platform server based on the data received in the IoT platform server to transmit a control command to the IoT device (S507). The IoT platform server stores the control command in the shadow device (S508) and transmits the control command to the IoT device (S509). When the IoT device performs a command following the control command and transmits the control result to the IoT platform server (S510), the IoT platform server stores the control result in the shadow device (S511). When the application server inquires or requests to transmit the control result (S512), it receives the transmitted data out of the shadow device in the same manner as the data inquiry process of Step S505 (S513).

Even if the IoT device is temporarily disconnected from the Internet, the shadow device storing the state information of the IoT device makes that information available whenever there is a data request from an application server. The shadow device also holds a control command when issued on the IoT device until it can deliver the same to the IoT device when reconnected to the Internet, thus enabling stable operation of the IoT service regardless of whether the IoT device is connected to the Internet.

Figure 6:
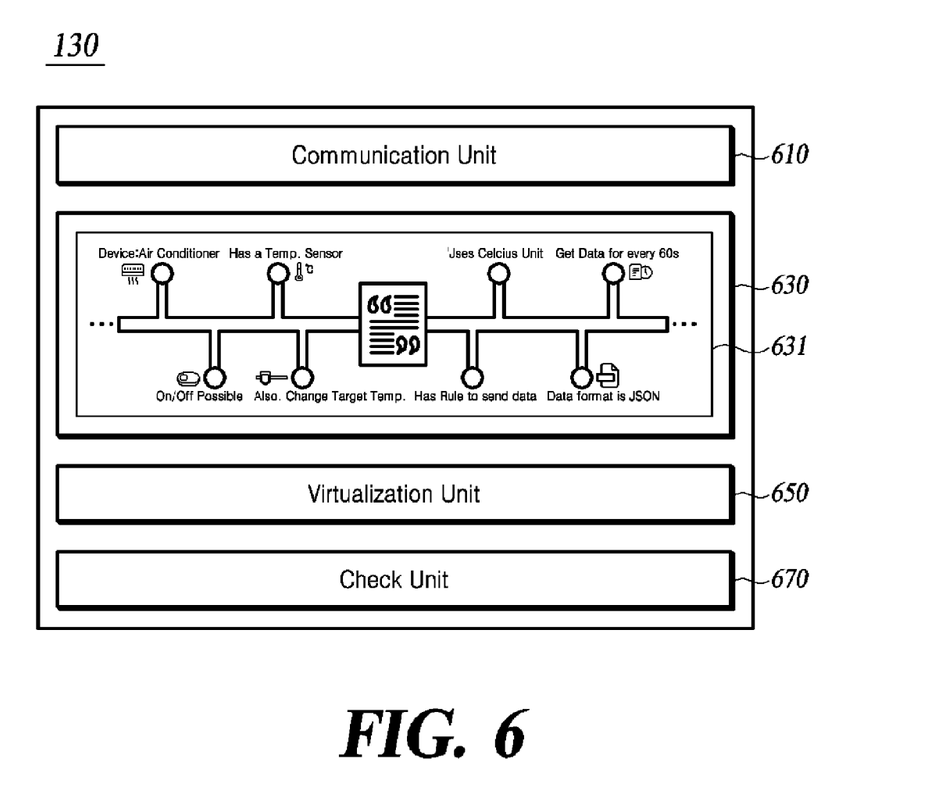
FIG. 6 is a block diagram of an IoT platform server according to another aspect of the present disclosure.

FIG. 6 is a block diagram of the configuration of an IoT platform server according to another aspect of the present disclosure.

As shown in FIG. 6, the IoT platform server 130 according to another aspect of the present disclosure includes a communication unit 610, a registration unit 630, and a virtualization unit 650.

The communication unit 610 may transmit/receive data in a wired, wireless, or other various communication methods through a communication network.

The communication unit 610 may be configured to establish a communication session with the IoT device 110 or the application server 150 accessing through a communication network, and to transmit and receive data with the IoT device 110 or the application server 150 through the communication session.

The registration unit 630 may perform registration and authentication of IoT devices 110, and register and manage specifications of common properties or features of common feature IoT devices 110.

In this case, a specification for the common features of the common feature IoT devices 110 will be referred to as a device descriptor 631.

The virtualization unit 650 may generate a shadow device corresponding to each IoT device 110 on the IoT platform server 130, and update the status of the shadow device based on the data received from the IoT device 110.

The virtualization unit 650 may manage matching information between the IoT devices 110 and their shadow devices and store and manage data for each of the plurality of shadow devices corresponding to its IoT device 110. At an access request by the IoT device 110 with respect to the IoT platform server 130, the virtualization unit 650 generates the shadow device corresponding to that IoT device 110. The virtualization unit 650 stores the data transmitted from the IoT device 110 in the corresponding shadow device, and retrieves and provides the data according to a request of the application server 150. In addition, upon receiving a control command for the IoT device 110 through the application server 150, the virtualization unit 650 stores information on the control command in the shadow device and renders the control command information stored in the shadow device to be transmitted to the IoT device 110.

The IoT platform server 130 according to another aspect of the present embodiment may further include a check unit 670.

The check unit 670 may check the validity of the data received from the IoT device 110 based on the device descriptor 631.

Device Descriptor (1) Configuration of Device Descriptor

The device descriptor 631 may include one or more of information about sensors common to the common feature IoT devices 110, information on controllable modules common to the common feature IoT devices 110, and information on the semantics, format, periodicity, transmission cycle, numerical range, and variable range of common data transmitted by the common feature IoT devices 110 to the IoT platform server 130.

The device descriptor 631 is capable of designating not only the semantics of data transmitted by the device but also the format so that the user can transmit data in the desired format. In particular, taking account of the IoT service property that values size reduction of the transmission data, the device descriptor 631 can transmit data in not only json format but also in reduced size of csv or offset based format. In spite of the reduced size, the device descriptor holding the content of the data enables the relevant IoT platform to provide a service based on the semantics of data.

The IoT device 110 may include one or more sensors and one or more controllable modules. The sensor may be a temperature sensor, a humidity sensor, a global positioning system (GPS), or the like, and the controllable module may be a motor, an actuator, a cooling fan, a heating wire, or the like.

Since the common feature IoT devices 110 are similar to each other by their sensor types and the controllable module types, the platform stage with features defined common to the common feature IoT devices 110 according to the present disclosure allows IoT service developers to easily develop a service provided to the common feature IoT devices 110.

The device descriptor 631 is a logical framework representing the common feature IoT devices 110, and not only has a specification of the IoT devices 110 but also all the information on, objects such as sensors and actuators linked to the IoT devices 110, the semantics of transmitted data, its format, and transmission cycle, and is a logical representative of the common feature IoT devices 110.

The IoT service developer may write information about a device to be used in the IoT service conforming to the format of the device descriptor 631 provided by the IoT platform. The device descriptor 631 may include Name, Device information, Attributes, Telemetries, and the like.

Name means the name of the device descriptor 631.

The device information is about the IoT device 110 itself and may include information on a manufacturer, a memory, a model, a version, a gateway, a connected sensor, and a controllable module.

Attributes mean the latest state information without periodicity among information transmitted by the IoT device 110. Attributes can be defined by IoT service developers themselves according to their service features or characteristics and can define names, types, semantics (definition of what this information actually means), controllability, data transmission format among others.

Telemetries means data having periodicity among information transmitted by the IoT device 110. Like Attributes, Telemetries can be defined by IoT service developers according to their service characteristics and can define names, types, semantics, transmission cycle, and others.

It is recommended to define Attributes for data that is not valued for history but the latest information. For example, since the location information of the IoT device 110 is recommended to be set as Attributes for use because only the latest location of the device is significant information. Certainly, when one needs a history of the position change of the IoT device 110, the location information transmitted by the IoT device 110 may be set as Telemetries. For example, in case of tracking service, the significance is in location information which then needs to be transmitted periodically, wherein the location information is preferably defined as Telemetries rather than Attributes.

Data with periodicity or historical records that are deemed significant are better defined as Telemetries. For example, when the temperature information measured by a temperature sensor of the IoT device 110 is periodically transmitted to the IoT platform server 130, this information becomes Telemetries information. On the contrary, when some IoT services to be provided need no history of the temperature change of the IoT device 110, the temperature information transmitted by the IoT device 110 may be set as Attributes.

(2) Example Device Descriptor

The IoT service developer may write a device descriptor 631 describing detailed information about the IoT device 110 according to a rule defined by an IoT platform according to at least one embodiment of the present disclosure.

The following is an example of the device descriptor 631.

```
{ "name": "Air Conditioner",
"title": "air conditioner descriptor",
"description": "This device descriptor 631 is a descriptor that contains a
specification for an air conditioner.",
"info": {
"memory": 1024,
"model": "AU1024ZU17",
"manufacturer": "SKTelecom",
"type": "Air Conditioner" },
"data": {
"format": "csv",
"delimiter": "|",
"attributes": [{
"name": "switch",
"semantic": "power",
"writable": true,
"writableValues": ["on", "off"], },
{"name": "temp",
"semantic": "temperature",
"writable": true,
"writableValues": [15, 16, 17, 18, 19, 20, 21, 22, 23, 24, 25, 26, 27, 28, 29, 30],
"type": "number" } ],
"telemetries": [{
"name": "ts",
"semantic": "timestamp",
"interval": 60,
"type": "posix" },
{ "name": "temp",
"semantic": "temperature",
"interval": 60,
"type": "number" },
{ "name": "h",
"semantic": "humidity",
"interval": 60,
"type": "number" } ]
} }
```

(3) Setting Device Descriptor

The IoT service developer may select the device descriptor 631 while registering the IoT device 110 which is a target of the developed IoT service. In particular, when a certain IoT device 110 is registered with the IoT platform server 130, the IoT service developer may set what kind of device descriptor 631 the IoT device 110 belongs to.

The device descriptor 631 contains all the definitions of the device, such as what kind of device it is, which sensors and actuators it has, what rules are associated with the actions that can be performed, and what are the semantics, formats, and transmission cycles of the transmitted data. Devices of the same kind will refer to a common specification.

(4) Data Validation with Device Descriptor

Since the device descriptor 631 includes a definition of a data format, the present disclosure is also capable of providing a function of determination and immediate processing of an actual data value. When real-life IoT devices 110 are registered with the IoT platform server 130 according to at least one embodiment of the present disclosure, they are supposed to be defined as being relevant to what specific device descriptors 631, whereby enabling the IoT platform according to at least one embodiment of the present disclosure to interpret the information of the actual IoT devices 110 and their transmitted data, and accordingly provide a variety of functions in the platform stage.

As an example, the IoT platform server 130 according to at least one embodiment of the present disclosure further includes the check unit 670 which may check the validity of data received from the IoT device 110.

The check unit 670 may determine that the data received from the IoT device 110 have an error or some missing data when their transmission does not occur once every transmission cycle as defined in the device descriptor 631.

In addition, the check unit 670 may determine that the data received from the IoT device 110 have an error when they have a value outside the numerical range as defined in the device descriptor 631.

Further, the check unit 670 may determine that the data received from the IoT device 110 have an error when they are transmitted in a format different from that as defined in the device descriptor 631.

In addition, the check unit 670 may determine that the data received from the IoT device 110 have an error when they change beyond the variable range as defined in the device descriptor 631.

Figure 7:
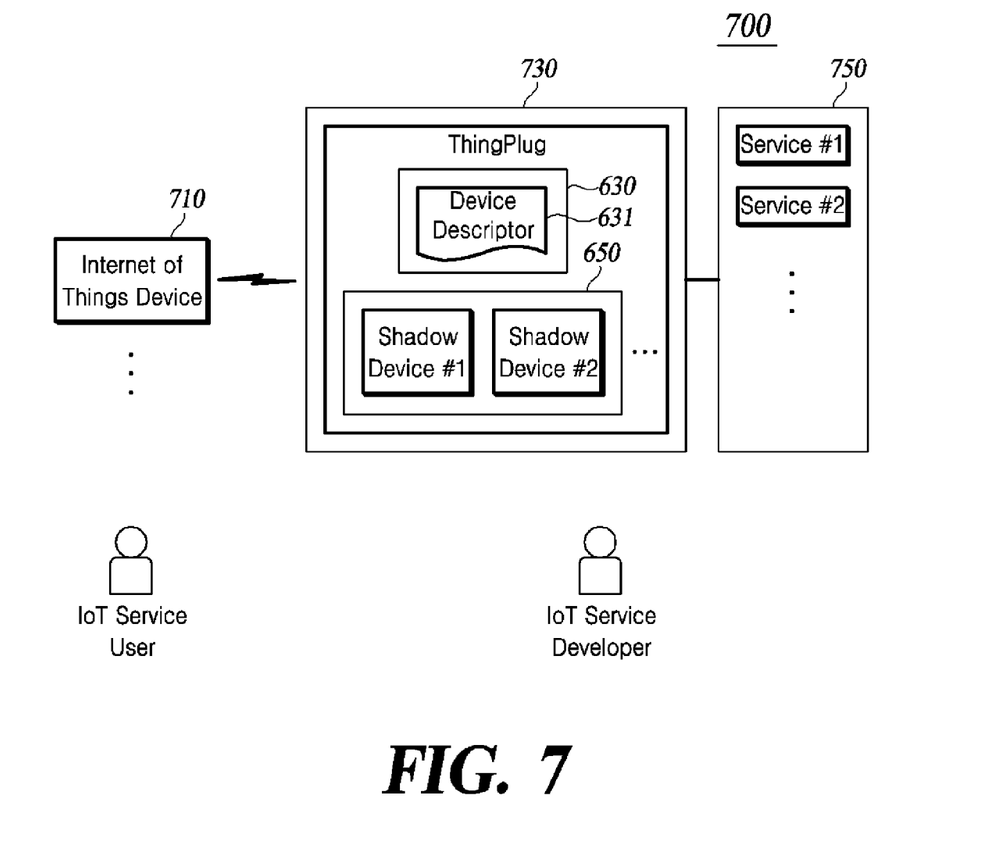
FIG. 7 is a block diagram showing in detail the structure of an IoT system according to another aspect of the present disclosure.

FIG. 7 is a block diagram showing in detail the structure of an IoT system according to another aspect of the present disclosure.

As shown in FIG. 7, an IoT system 700 according to another aspect of the present disclosure includes one or more IoT devices 710, an IoT platform server 730, and an application server 750.

The IoT device 710 means Thing in the Internet of Things (IoT), and in one embodiment of the present disclosure, the IoT device 710 refers to a node having a sensor, an actuator, and the like and to a gateway to which a plurality of nodes are connected.

The IoT platform server 730 is a server on which the IoT platform is implemented, and provides various functions for developing and operating an IoT service.

The device descriptor 631 refers to a specification of common features of the common feature IoT devices 710 as described above. The device descriptor 631 is a logical framework representing the common feature devices. The device descriptor 631 holds not merely a device specification, but all information such as a specification, connected sensors and actuators, and the semantics of the transmitted data, its format, and the transmission cycle. The device descriptor 631 is the logical representative factor of the connected devices.

Where the device descriptor 631 represents the common feature devices, the shadow devices are mapped 1:1 with the physical devices so that each device is logically present on the IoT platform server 730. The shadow devices may be mapped not only to the physical devices but also to virtual devices.

The IoT service user refers to a person who actually uses the IoT service, and may own the IoT device 710 or use the IoT service.

The IoT service developer represents a person who develops an IoT service by using the IoT platform, and may or may not be the same as the IoT service user.

The basic function of the IoT platform is to receive the data of the IoT device 710 in good condition and pass it to the application server 750. The IoT platform is adapted to first provide the function for transmitting a control command issued from an application program or "app" of the application server 750 to the IoT device 710 and further provide various featured functions such as an API function, a UI editing function, etc. required for making various IoT services.

The conventional IoT platform is focused on managing the connection of the IoT device 710 and delivering data to the application server 750 without losing data. Although suited to providing basic functions for reliable delivery of data, the prior art is yet to present a specification of data toward analyzing IoT data and providing additional meaningful information. Because of the shortcoming, to perform tasks such as data delivery, consistency check, and data analysis requires additional works in those regards at an app level.

In contrast, using the IoT platform according to at least one embodiment of the present disclosure, the IoT service developer can easily process and manage information necessary for the IoT service with the device descriptor 631. Since the device descriptor 631 has not only the specification of the IoT device 710 but also the type and format of data to be transmitted, and even the semantics, the IoT service developer can now offer various services by using such a device descriptor.

The device descriptor 631 acts as basic information which provides collecting data and taking actions in context with data semantics, in addition to simply passing data and giving control commands. This enables the IoT service developer utilizing the device descriptor 631 to easily access various services required for the IoT service, and allows the developer to not only easily update the properties and functions of various devices, but also simplify the management and service access therefor.

The IoT service developer may connect several services to a single device descriptor 631. For example, one device descriptor 631 may be defined and the desired rule may be set for a specific sensor value therein, or the entire data may be processed through a rule engine and sent to a data analysis tool. Data may also be sent out only for a certain period through a configuration based on the device descriptor 631.

For example, assuming that an IoT service developer is creating an IoT service related to a gas advanced metering infrastructure (AMI), and installs one hundred gas meters with common features, the developer may first write the device descriptor 631 for describing the gas meter. Then, when registering the actual meters to the IoT platform, the developer is advised to specify which device descriptor 631 the meters belong to.

When it is desired to send a rule that needs to be commonly applied to the meter reading data or specific data to an analysis system, the IoT service developer can perform the desired configuration based on the device descriptor 631 without specifying the individual meters. For example, when information is transmitted from a meter belonging to a specific device descriptor 631, the data may be analyzed and processed based on sensor information defined in that device descriptor 631.

Hereinafter, an example of using the device descriptor 631 will be described.

Use of Device Descriptor (1) Linking to Various Rule Engines

With the device descriptor 631, a developer can know the semantics of data transmitted from the IoT device 710, and thereby link the data easily to various rules. For example, when an air conditioner is desired to operate automatically when the discomfort index rises more than, say, 70, the developer may calculate the discomfort index by compounding the information submitted by the humidity sensor with the information submitted by the temperature sensor and set up a rule for giving control commands. With the device descriptor 631 including information on semantics, data submitted in any form may be easily linked to the rule engine to set a rule. The detailed manner of this operation will be described below.

① The IoT service developer describes and registers device descriptors 631.

② When registering IoT devices 710, the developer defines which device descriptors 631 the IoT devices 710 belong to.

③ When the actual IoT devices 710 transmit data, the developer has the IoT platform interpret the data through the device descriptors 631.

④ When desiring to have an action according to a specific sensor value, the IoT service developer or user defines a corresponding rule. In the above example, the developer compounds the temperature and humidity data to calculate the discomfort index and defines a rule that performs responsive actions.

⑤ When defining a rule, the developer determines a set of sensors to be combined to calculate the discomfort index by designating the sensors defined in the device descriptor 631.

⑥ When the data is transmitted, the IoT platform interprets the data based on the device descriptors 631, calculates the discomfort index according to the rule, and then proceeds to process by the rule.

(2) Linking to External IoT Data Analysis Service

Most data analysis services are available only with a defined schema. In an IoT service arrangement, it is common that no schema is defined in data because the data needs to be reduced as much as possible due to issues like sensor device power, price, and communication fee. However, with the device descriptor 631, the present disclosure has the informed semantics of the data sent from devices to allow easy interworking with an external analysis service.

(3) Malfunction Check

Occasional omissions of sensor data periodically transmitted from the IoT service may pose a significant problem depending on the service properties. Since the device descriptor 631 of the IoT platform according to at least one embodiment of the present disclosure includes a data transmission cycle of the sensor, the sensor data can be checked at the platform stage, and thus, data omissions or malfunction can be easily confirmed.

(4) Data Consistency Check

With the device descriptor 631 holding information on both the semantics and the format of the data, one can check data consistency at the platform stage. For example, where the semantics are defined in degrees Celsius when data transmitted from the IoT device 710 is '−300' which is an impossible value, it is immediately known that the data is in error, to which a platform-level response becomes available. Similarly, when data is transmitted in a format other than a pre-agreed format, it is immediately known that the data is in error, to which a platform-level response becomes available.

(5) Linking to Service Available for Device Set

Devices with the same device descriptor 631 can be linked to the same service, which empowers IoT service developers using the platform to more easily develop IoT services.

Figure 8:
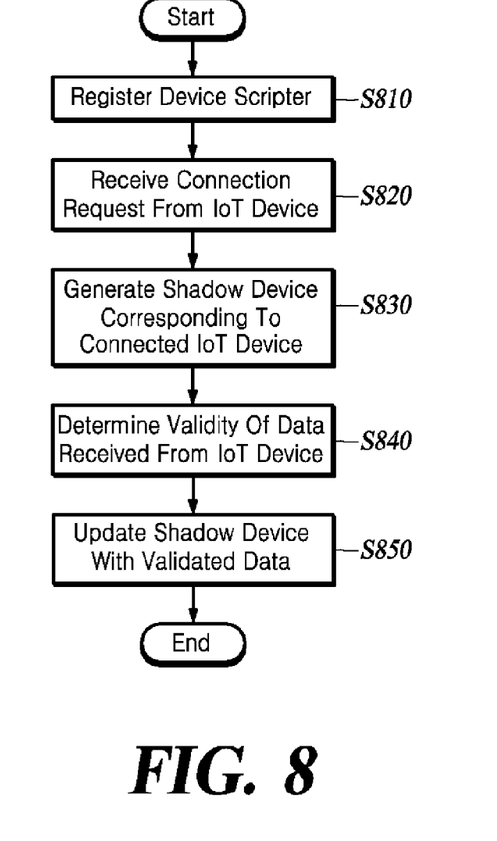
FIG. 8 is a flowchart illustrating a method of providing an IoT platform service according to yet another aspect of the present disclosure.

FIG. 8 is a flowchart illustrating a method of providing an IoT platform service according to yet another aspect of the present disclosure.

As shown in FIG. 8, the method of providing an IoT platform service according to yet another aspect of the present embodiment may include steps of registering a specification (device descriptor 631') for common features of a plurality of devices (S810), receiving a connection request from one or more IoT devices 710 (S820), generating a shadow device corresponding to each IoT device 710 (S830), receiving data from the IoT device 710 (S840), and updating the state of the shadow device based on data received from the IoT device 710 (S850).

According to at least one embodiment of the present disclosure, the method for providing an IoT platform service further includes a step S840 of determining validity of the data received from the IoT device 710 based on the device descriptor 631 between the receiving of data from the IoT device 710 and the updating of the state of the shadow device.

The process of determining validity will be described in detail. Data can be determined as having an error when the data with their transmission cycle defined in the device descriptor 631 are not transmitted at every transmission cycle, when the data with their numerical range defined in the device descriptor 631 have a value outside the defined numerical range, when the data with their format defined in the device descriptor 631 are transmitted in a format different from the defined format, or when the data with their variable range defined in the device descriptor 631 fluctuate beyond the defined variable range.

To avoid redundancy, details that overlap with the above description will be omitted.

As described above, FIG. 4, FIG. 5, and FIG. 8 are illustrated with their processes being performed sequentially, although the present disclosure is not necessarily limited thereto. In other words, FIG. 4, FIG. 5, and FIG. 8 are not limited to the illustrated chronological sequences because they may be modified in practice of the present disclosure, or have one or more of those processes of FIGS. 4, 5, and 8 performed in parallel.

The method of providing an IoT platform service according to some embodiments illustrated in FIGS. 4, 5, and 8 may be implemented as an app. (or a program) and recorded on a recording medium readable by a terminal device (or a computer). A non-transitory computer-readable (or terminal-readable) recording medium may be provided for recording an app. (or program) for implementing the IoT platform service providing method according to some embodiments and include any type of recording device on which data that can be read by a computer system are recordable.

Although exemplary embodiments of the present disclosure have been described for illustrative purposes, those skilled in the art will appreciate that various modifications, additions, and substitutions are possible, without departing from the idea and scope of the claimed invention. Therefore, exemplary embodiments of the present disclosure have been described for the sake of brevity and clarity. The scope of the technical idea of the present embodiments is not limited by the illustrations. Accordingly, one of ordinary skill would understand the scope of the claimed invention is not to be limited by the above explicitly described embodiments but by the claims and equivalents thereof.

CROSS-REFERENCE TO RELATED APPLICATION

This application claims priority from Korean Patent Application No. 10-2017-0135919 filed on Oct. 19, 2017, and Korean Patent Application No. 10-2017-0141491 filed on Oct. 27, 2017, the disclosures of which are incorporated by reference herein in their entireties.

The invention claimed is:

1. A method of providing an Internet of Things (IoT) platform service, the method comprising:
generating one or more shadow devices corresponding to one or more IoT devices;
receiving state information of the one or more IoT devices and storing the state information in the shadow devices when the state information is updated;
determining whether a predetermined rule condition is satisfied based on the state information stored in a corresponding device;
performing, by an IoT device, a predetermined operation responsive to determining that the predetermined rule condition is satisfied;
storing, in the shadow device, a control command received or performed by the IoT devices; and
sending, the control command from the shadow device to the IoT device when the IoT device and the IoT platform service are disconnected and reconnected.

2. The method of claim 1, wherein the control command is generated in response to receiving an input from a user.

3. The method of claim 1, wherein the storing of the state information in the shadow devices comprises:
storing, after processing, the state information according to a rule defined in a rule engine by using the state information that is previously stored in the shadow devices and the state information having been updated.

4. The method of claim 1, wherein the storing of the state information in the shadow devices comprises:
storing, after aggregating, data based on the state information that is previously stored in the shadow devices and the state information having been updated.

5. An Internet of Things (IoT) platform service server apparatus, comprising:
a communication unit configured to communicate with one or more IoT devices;
a shadow device manager configured to generate one or more shadow devices corresponding to the one or more IoT devices;
the shadow devices configured to:
receive state information of the IoT devices and store the state information when the state information is updated,
store a control command received or performed by the one or more IoT devices responsive to a predetermined rule condition being satisfied for performing a predetermined operation by the one or more IoT devices, and
send, the control command to an IoT device when the IoT device when the IoT device and the IoT platform service server are disconnected and reconnected; and
a rule engine configured to determine whether the predetermined rule condition is satisfied by using the stored state information in the shadow devices.

6. The IoT platform service server apparatus of claim 5, wherein the control command is generated in response to receiving an input from a user.

7. The IoT platform service server apparatus of claim 5, wherein the shadow device manager is configured to control storing, after processing, the state information according to a rule defined in the rule engine, in the shadow devices, by using the state information that is previously stored in the shadow devices and the state information having been updated.

8. The IoT platform service server apparatus of claim 5, wherein the shadow device manager is configured to control storing in the shadow devices, after aggregating, data based on the state information that is previously stored in the shadow devices and the state information having been updated.

* * * * *